Patented Aug. 14, 1945

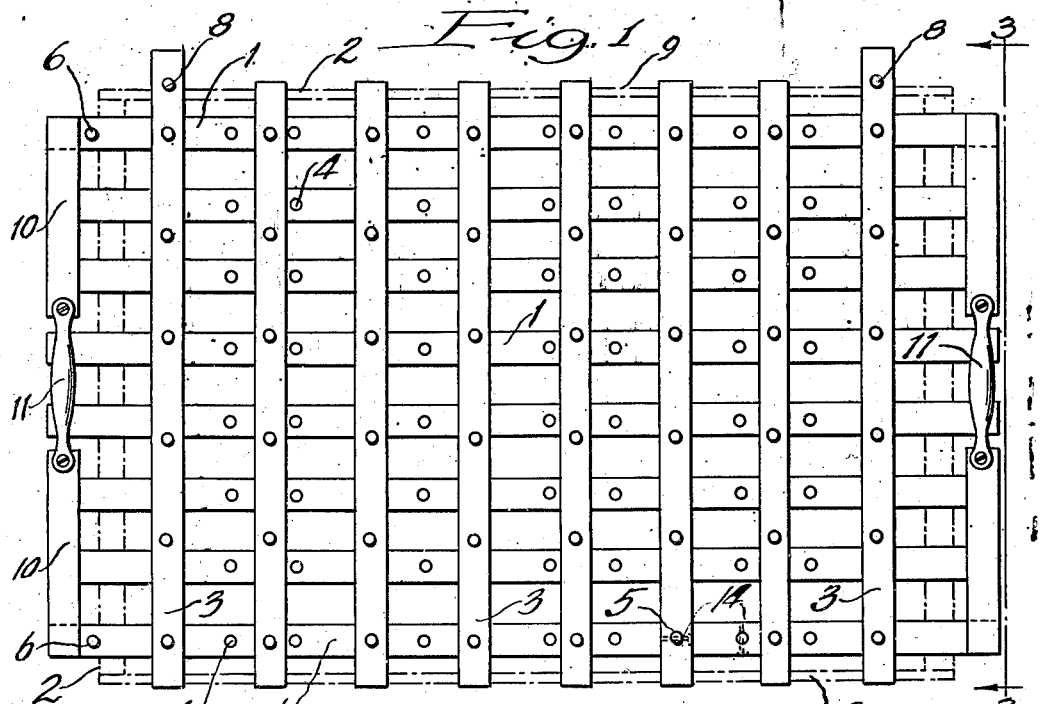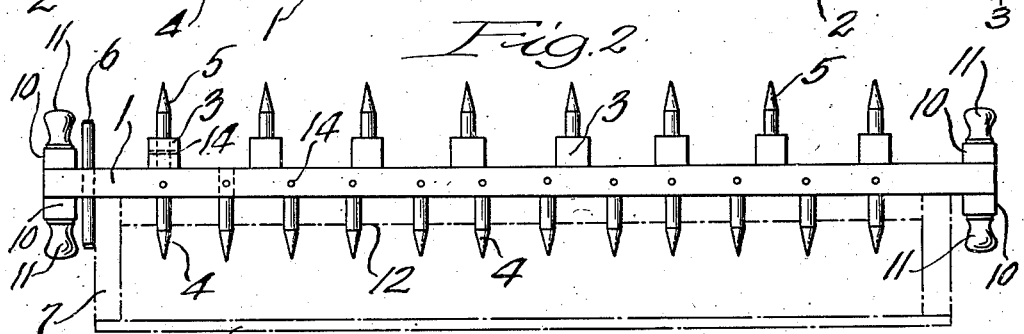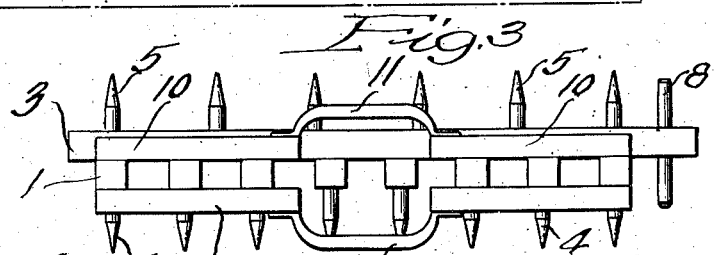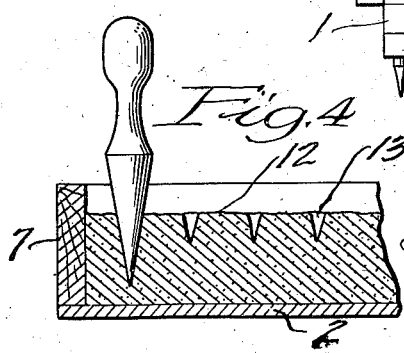

2,382,221

UNITED STATES PATENT OFFICE 2,382,221

PLANTING SPACER FOR FLATS

Albert T. Groth, Oshkosh, Wis.

Application May 20, 1943, Serial No. 487,697

2 Claims. (Cl. 47—37)

This invention relates to greenhouse equipment and particularly to devices for marking the location of plants in beds and the facilitating of the planting thereof.

The main objects of this invention are to provide a dibbling device whereby plants that are grown in flats can be planted and spaced according to a uniform pattern within the flats with a minimum expenditure of time and by even a very inexperienced operator; to provide an improved form of marker which will enable the operator to make depressions in the soil in the flat for receiving seeds, cuttings, or seedling plants and to assure uniformity of the size and depth of such openings throughout the area of the flat; to provide a device of this kind which, without requiring adjustment, may provide for planting certain plants at one spacing and for planting others at a different spacing; and to provide a structure for such devices which can be easily manipulated and which is of such open character that the operator may see through it as he guides it into position on a flat.

A specific embodiment of this invention is shown in the drawing in which:

Figure 1 is a top plan of an improved marker showing the same at rest on the top rim of a flat, which is indicated by broken lines.

Fig. 2 is a side elevation of the same, the flat and surface of the soil therein being again indicated by broken lines.

Fig. 3 is an end elevation as viewed from the line 3—3 of Fig. 1.

Fig. 4 is a fragmentary section of a flat showing the soil therein indented by the marker as a preliminary to the enlargement of the pockets in the soil by means of an individual dibbler such as might be employed when it is desired to enlarge the pockets for the replanting of relatively large plants.

In the form shown in the drawing, the main frame is in the nature of a lattice made up of a series of longitudinal bars 1 uniformly spaced sidewise and of a length slightly greater than the length of the flat 2 for which the device is designed and these bars 1 are overlaid by a series of transverse bars 3 which are of a length slightly greater than the width of the flat 2.

Each of the bars 1 carries a series of depending dibble pins 4 which are uniformly spaced apart along the bar 1 and the spacing of the bars 1 preferably corresponds to the spacing of the pins 4 along these bars so that the depressions made by these pins on the soil in the flat will be uniformly spaced both longitudinally and transversely.

The crossbars 3 of the frame are spaced apart at greater intervals than the longitudinal bars 1 and have upstanding dibble pins 5 uniformly spaced along the bars at approximately the same intervals at the center-to-center spacing of the bars 3.

The two outermost longitudinal bars 1 each carries an abutment element in the nature of a vertical pin 6 extending both above and below the bars 1 to engage an end wall of the flat and serve as a guide for positioning the dibble pins 4 longitudinally with respect to the flat when the device is in the position shown in Figures 1 and 3. Similarly, a pair of widely spaced transverse bars 3 carries at one side a pair of pins 8 which extend both above and below the bars 3 a sufficient distance to engage the side wall 9 of the flat and determine the transverse spacing of the dibble pins with respect to the flat. These pins 6 and 8 are of sufficient length to serve as guides either for the set of dibble pins 4 when the device is in the position shown or for the dibble pins 5 when the device is inverted on the flat.

The extremities of the longitudinal bars 1 are bridged by transverse cleats 10 on both their upper and lower surfaces and these carry centrally located handles 11 both above and below the frame, which handles have horizontal hand grips so that when they are held in the hands of the operator, the frame of the device will be balanced in a horizontal position.

In operation, the operator grasps the upstanding pair of handles 11 in such manner that the desired dibble pins 4 or 5, as the case may be, will be in position for use. Then by bringing the abutment pins 6 against one end of the flat and the abutment pins 8 against one side of the flat a downward thrust on the handles will carry the dibble pins into the soil and make spaced rows of pockets in the desired pattern for receiving the plants. In Figures 2 and 4 the surface of the soil is indicated at 12 and the pockets are indicated at 13.

By means of such a marker, the flats can be rapidly handled and a single operator can prepare the flats for a large number of operators performing the function of inserting plants into the pockets.

The dibble pins 3 and 4 are permanently held in place by brads 14 or the like, but the abutment pins 6 and 8 are preferably free so that the operator may shift them up and down with respect to the frame to a position that will best suit his convenience in guiding the device into a position of rest on the surface of the flat. The open frame work enables him to watch the lower ends of these pins as he brings them into contact with the walls of the flat.

Although but one specific embodiment of the invention is herein shown and described, it will be understood that numerous details of the structure shown may be altered or omitted without departing from the spirit of the invention as defined by the following claims.

I claim:

1. A plant marker for flats comprising a unitary lattice frame shaped to rest horizontally on the rim edges of a plant flat and having a series of parallel uniformly laterally spaced bars overlaid crosswise by a second series of parallel uniformly laterally spaced bars, each bar of one series of said bars having thereon a series of upstanding dibble pins and each bar of the other series of said bars having thereon a series of depending dibble pins, the pins on each bar being spaced along the bar to conform with the spacing of such bars from each other, and each series of bars being spaced differently than the other series.

2. A planting spacer, comprising a series of parallel bars laterally spaced apart at uniform intervals, a second series of parallel bars overlaid crosswise on said first series and laterally spaced apart at uniform intervals different from the intervals of said first-named series, the upper series of bars having upstanding dibble pins spaced apart along the bars at intervals equal to the upper bar spacing intervals, and the lower series of bars having depending dibble pins spaced apart along the bars at intervals equal to the lower bar spacing intervals, whereby the two sets of dibble pins will be symmetrically distributed at different intervals over the same horizontal area.

ALBERT T. GROTH.